(12) United States Patent
Nealey

(10) Patent No.: US 6,656,088 B2
(45) Date of Patent: Dec. 2, 2003

(54) MANUAL TRANSMISSION ELECTRONIC THROTTLE ADVANCE SYSTEM

(76) Inventor: Gary Nealey, 53 Tow Path Rd., Gorham, ME (US) 04038

( * ) Notice: Subject to any disclaimer, the term of this patent is extended or adjusted under 35 U.S.C. 154(b) by 8 days.

(21) Appl. No.: 09/781,641

(22) Filed: Feb. 12, 2001

(65) Prior Publication Data

US 2002/0111240 A1 Aug. 15, 2002

(51) Int. Cl.$^7$ .................. B60K 41/04; B60K 41/02
(52) U.S. Cl. .................. 477/110; 477/83; 477/181
(58) Field of Search ................ 477/110, 112, 477/77, 80, 905, 181, 83, 84; 701/53, 54, 93

(56) References Cited

U.S. PATENT DOCUMENTS

| | | | | |
|---|---|---|---|---|
| 4,248,333 A | * | 2/1981 | Matsumoto et al. | 192/52 |
| 4,493,228 A | * | 1/1985 | Vukovich et al. | 477/109 |
| 4,740,898 A | * | 4/1988 | McKee et al. | 180/306 |
| 4,938,088 A | * | 7/1990 | Langley et al. | 74/335 |
| 5,067,578 A | * | 11/1991 | Shirata et al. | 180/197 |
| 5,366,424 A | * | 11/1994 | Wataya | 477/107 |
| 5,547,438 A | * | 8/1996 | Nozaki et al. | 477/169 |
| 5,593,363 A | * | 1/1997 | Asai et al. | 477/74 |
| 5,759,131 A | * | 6/1998 | Kosik et al. | 477/84 |
| 6,006,880 A | * | 12/1999 | Daniel | 192/3.57 |
| 6,314,342 B1 | * | 11/2001 | Kramer et al. | 701/1 |

* cited by examiner

Primary Examiner—Tisha D. Lewis
(74) Attorney, Agent, or Firm—Pierce Atwood; Kevin M. Farrell

(57) ABSTRACT

A computer-implemented method for initiating forward motion in a vehicle equipped with a manual transmission. The method includes the steps of providing a sensor for determining clutch status; providing a sensor for determining when a transmission of a vehicle is in first gear; providing a throttle actuator calibrated to raise engine revolutions per minute from idle to a predetermined elevated level upon receipt of a throttle-up signal; and providing a control unit to receive inputs from the clutch and gear status sensors. The control unit is programmed to deliver the throttle-up signal to the throttle actuator when the sensor of clutch status indicates that a change in clutch status from engaged to non-engaged, and the gear sensor indicates that the vehicle is in first gear.

1 Claim, 1 Drawing Sheet

MANUAL TRANSMISSION ELECTRONIC THROTTLE ADVANCE SYSTEM

BACKGROUND OF THE INVENTION

Land vehicles use two types of transmission systems, a manual transmission and an automatic transmission. When operating a vehicle equipped with a manual transmission, a driver is required to manually change the gears in the transmission by disengaging a clutch, moving a shift to change the gears in the transmission, and then re-engaging the clutch thereby providing power to the drive train. This combination of movements can be very difficult for the unskilled driver.

The actions described in the preceding paragraph become particularly troublesome when the vehicle is stopped, facing uphill on an incline. Initiating forward motion from such a position requires the driver to release the brake with their right foot, move their right foot to the accelerator pedal and advance the throttle while simultaneously releasing the clutch pedal slowly with the left foot. These actions must be perfectly executed by the driver. The potential consequences of a mistake include, for example, stalling the vehicle. The vehicle may stall in traffic or roll backwards into another vehicle.

For these reasons many drivers choose to use vehicles with automatic transmissions, the operation of which does not require the carefully timed actions referred to above. However, manual transmissions offer advantages that when compared to automatic transmissions, these advantages included a lower manufacturing cost and therefore a lower retail cost to the driver, increased fuel efficiency, and enhanced vehicle performance. For these reasons, many drivers continue to prefer manual transmissions over automatic transmissions.

An improved manual transmission system which simplifies the operations referred to above would represent an advance in the art which would enable less skilled drivers to safely operate a vehicle so equipped.

SUMMARY OF THE INVENTION

The present invention relates, in one aspect, to a computer-implemented method for initiating forward motion in a vehicle equipped with a manual transmission. The computer-implemented method includes a number of components including:

a) a sensor for determining clutch status;

b) a sensor for determining when the transmission of the vehicle is in first gear;

c) a throttle actuator calibrated to raise engine revolutions per minute from idle to a predetermined elevated level upon receipt of a throttle-up signal; and d) a control unit to receive inputs from the sensors of steps a) and b), said control unit being programmed to deliver the throttle-up signal to the throttle actuator when the sensor of step a) indicates that a change in clutch status from engaged to non-engaged, and the sensor of step b) indicates that the vehicle is in first gear.

DETAILED DESCRIPTION OF THE INVENTION

Figure 1:
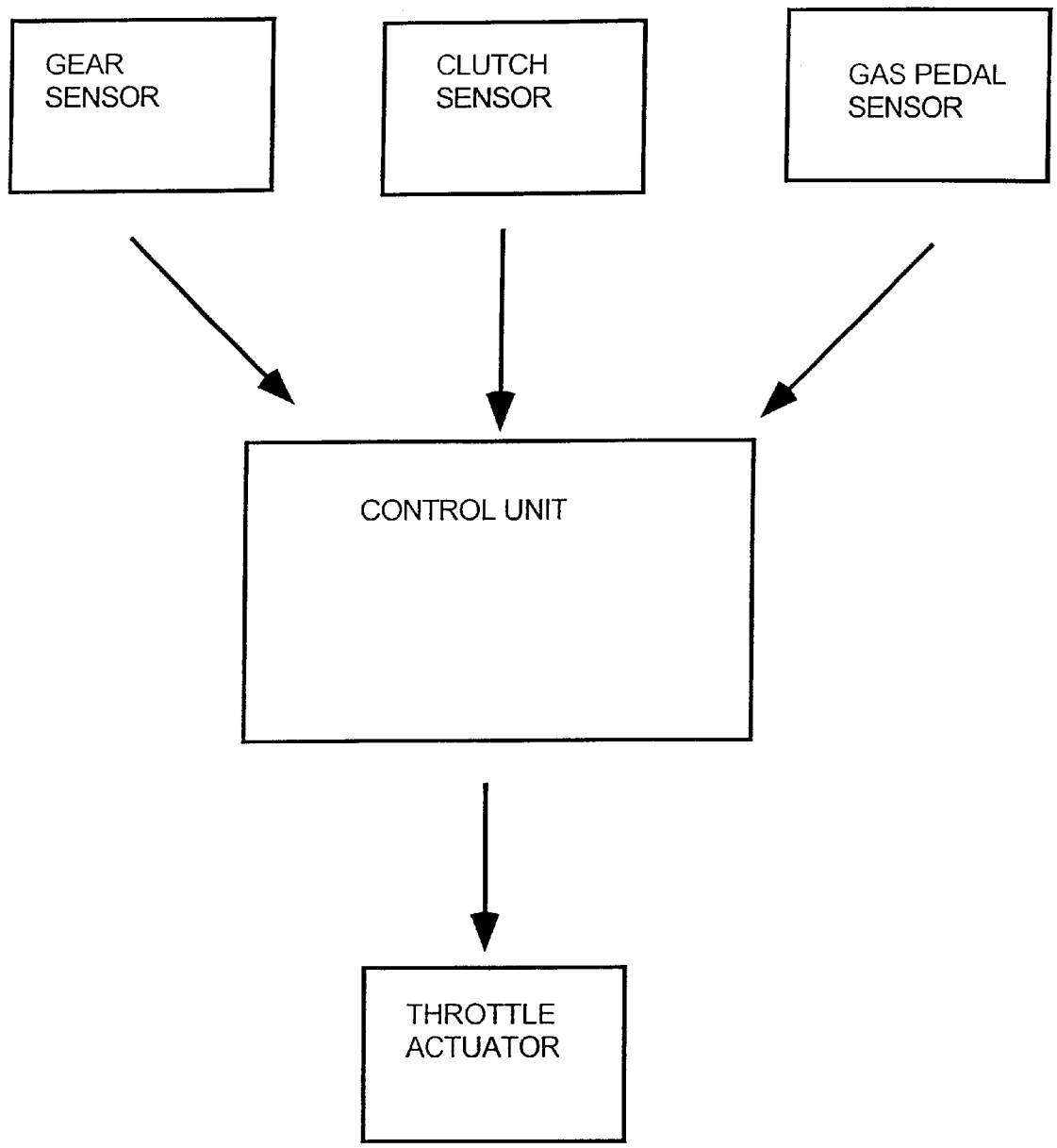
FIG. 1 is a schematic diagram representing the elements of the preferred embodiment of the invention.

The present invention relates to a computer-implemented method for initiating forward motion in a vehicle equipped with a manual transmission. Referring to FIG. 1, a schematic representing the elements of the preferred embodiment is shown. The system comprises a control unit, which is preferably hard-wired to a sensor array. In preferred embodiments, the sensor array includes a clutch sensor, a gear sensor and a gas pedal sensor. The three sensors referred to above provide inputs to the control unit as to the status of individual components. When the clutch pedal is depressed, thus disengaging the clutch, this is sensed by the clutch sensor. Release of the clutch pedal, which causes engagement of the clutch, is also sensed, and release of the clutch pedal results in the sending of a signal from the clutch sensor to the control unit. If the transmission of the vehicle is in any position other than first gear, as determined by the gear sensor, then the signal from the clutch sensor to the control unit will not result in the issuance of a throttle-up signal from the control unit to the throttle actuator. However, if the transmission of the vehicle is in first gear, the gear sensor sends a signal to the control unit indicating that this is the case. If the control unit receives a signal from the clutch sensor indicating that the clutch pedal has been released, and also receives a simultaneous signal from the gear sensor indicating that the vehicle is in first gear, then the control unit will issue a throttle-up signal to the throttle actuator. The throttle-up signal is received by the throttle actuator which responds by elevating the engine revolutions per minute from idle to a predetermined elevated level.

Upon receipt of the throttle-up signal from the control unit, the throttle actuator maintains the elevated revolution per minute level until it receives a cancel throttle-up signal. The cancel throttle-up signal is sent by the gas pedal sensor to the control unit upon the sensing of the depression of the accelerator pedal by the operator of the vehicle. Alternative cancel throttle-up signal could be sent from the clutch sensor (if, for example, the clutch pedal is re-depressed following the issuance of the throttle-up signal), or from the gear sensor (if, for example, the gear box is shifted out of first gear).

In a preferred embodiment of the present invention, the gear sensor is located in the transmission and provides a signal when the vehicle has been shifted from neutral to first gear. The clutch sensor may be designed to sense the position of the clutch pedal. Alternatively, a sensor may be designed which is internal to the clutch mechanism. In preferred embodiments, the clutch sensor is a plunger-type switch which is contacted and depressed by the clutch pedal as it is depressed by the operator of the vehicle. An optical sensor is another example of the many types of sensors which may be used to determine clutch status. Similarly, the gas pedal sensor may be designed in a number of alternative formats, the design and calibration of which represents a matter of routine experimentation to one skilled in the art.

The throttle actuator is calibrated to elevate engine revolutions per minute upon receipt of a signal from the control unit. In preferred embodiments, the throttle actuator is a simple mechanical linkage attached to the throttle arm of the vehicle. While not being limited to the following, some parameters that can be used to establish the predetermined set point include engine capacity, vehicle weight, and transmission performance characteristics. In one embodiment, the throttle actuator is calibrated to increases the engine speed from idle to about 2,000 revolutions per minute.

Optionally, a brake release mechanism linked to the control unit may be employed. Such a mechanism would be designed to automatically release wheel brakes as the clutch pedal is let out while the vehicle is in first gear. The brake release signal would be timed to issue following shortly after the issuance of the throttle-up signal.

The control unit itself is a microprocessor device programmed to receive and transmit electrical signal of the type described above. It is a matter of routine experimentation to one skilled in the art to generate the programming necessary to accomplish the tasks outlined herein.

What is claimed is:

1. A computer-implemented method for initiating forward motion in a vehicle equipped with a manually-operated clutch, said method comprising the steps of:

a) providing a sensor for determining clutch status;

b) providing a sensor for determining when a transmission of a vehicle is in first gear;

c) providing a throttle actuator calibrated to raise engine revolutions per minute from idle to a predetermined elevated level upon receipt of a throttle-up signal;

d) providing a control unit to receive inputs from the sensors of steps a) and b), said control unit being programmed to deliver the throttle-up signal to the throttle actuator when the sensor of step a) indicates that a change in clutch status from non-engaged to engaged, and the sensor of step b) indicates that the vehicle is in first gear; and e) providing a gas pedal sensor which communicates with the throttle actuator via the control unit, the control unit being programmed to cancel the throttle-up signal upon receipt of a signal from the gas pedal sensor indicating that the operator has depressed the gas pedal.

* * * * *